CONNECTING STRUCTURE FOR BEAMS OF A ROOF SUPPORT OR THE LIKE

Original Filed May 23, 1955 2 Sheets-Sheet 1

Inventors:
Aloys Vanwersch
Peter Vanwersch
Ludwig Vanwersch
By Michael S. Striker
Attorney CONNECTING STRUCTURE FOR BEAMS OF A ROOF SUPPORT OR THE LIKE
Original Filed May 23, 1955 2 Sheets-Sheet 2
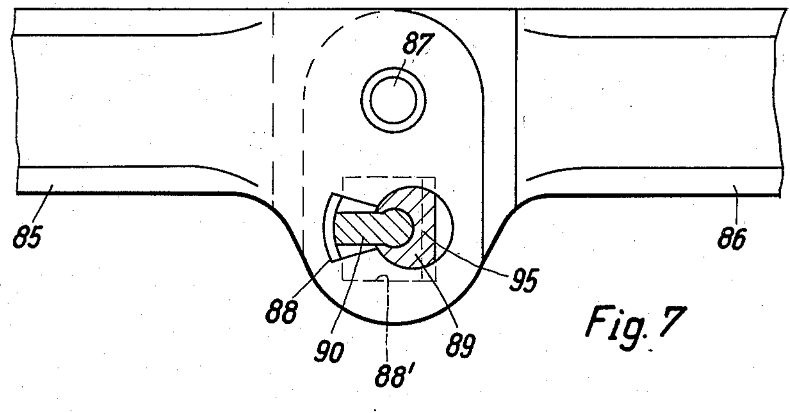
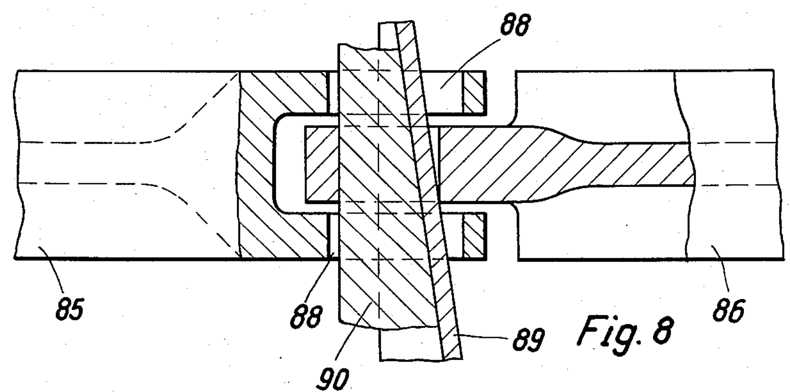
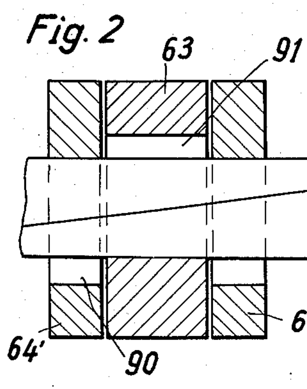
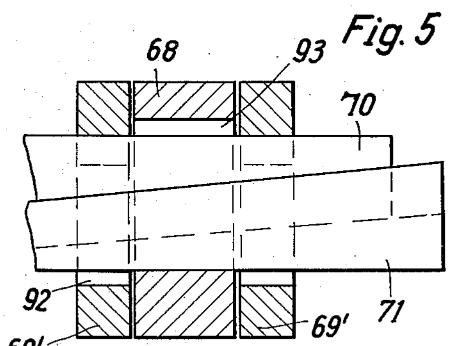
Inventors:
Aloys Vanwersch.
Peter Vanwersch.
Ludwig Vanwersch
BY Michael S. Striker
Attorney United States Patent Office 2,991,102 Patented July 4, 1961

2,991,102

CONNECTING STRUCTURE FOR BEAMS OF A ROOF SUPPORT OR THE LIKE

Aloys Vanwersch, Angermund, Bezirk Dusseldorf, Peter Vanwersch, Aachen, and Ludwig Vanwersch, Eschweiler, near Aachen, Germany, assignors to Firma Eisenwerk Wanheim G.m.b.H., Duisburg-Wanheim, Germany Original application May 23, 1955, Ser. No. 510,204. Divided and this application Dec. 24, 1958, Ser. No. 782,856

In France July 8, 1948

Public Law 619, Aug. 23, 1954

Patent expires July 8, 1968

5 Claims. (Cl. 287—99)

This application is a divisional application of our copending application Serial No. 510,204, filed on May 23, 1955.

The present invention relates to supporting structures particularly of the type used to support the roof of a mine shaft or the like.

Particular problems are involved in supports of the above type because, on the one hand, they must be robust enough to withstand great forces and because, on the other hand, they must be flexible enough to conform to whatever shape the roof of the mine shaft or the like happens to take.

One of the objects of the present invention is to solve the above problems by providing connections between a plurality of beams which lend to the connected beams sufficient flexibility to conform to a given roof shape and which also lock the beams together in such a way that they provide an extremely strong support.

Another object of the present invention is to provide a beam connecting structure of the above type which is exceedingly simple and which prevents angular displacement of a pair of beams with respect to each other in either direction.

Furthermore, it is an object of the present invention to provide a beam arrangement of the above type which may be disassembled whenever desired to have the beams reversed, for example.

Also, it is an object of the present invention to provide a beam adjusting structure which in addition to adjusting the angle between a pair of successive beams serves also to lock the beams in their adjusted position.

With the above objects in view, the present invention mainly consists of a supporting structure which includes a first beam having a bifurcated end portion provided with a pair of spaced walls each of which is formed with openings, the openings of one wall being aligned with those of the other wall. A second beam has an end portion extending between the spaced walls of the first beam and formed with openings aligned with those of the spaced walls. A pivot pin extends through one set of aligned openings so that the first and second beams are turnable with respect to each other to a desired angular position, and one or more elongated wedge members extend through the other set of aligned openings for locking the beams in a given angular position as well as for turning the beams to the desired angular position.

According to an additional feature of the invention, a plurality of wedge members, at least two, extend through the same set of openings so that at least one of the wedge members abuts against each of the beams respectively, and the wedge members abut against each other.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 2 is a sectional view of the embodiment shown in FIG. 1, the section being taken along the line 2—2 of FIG. 1, viewed in the direction of the arrows;

FIG. 5 is a sectional view of the embodiment shown in FIG. 4, the section being taken along the line 5—5 of FIG. 4, viewed in the direction of the arrows;

FIG. 7 is a fragmentary side elevational view of another embodiment; and

FIG. 8 is a partially sectioned fragmentary top view of the embodiment of FIG. 7.

Figure 1:
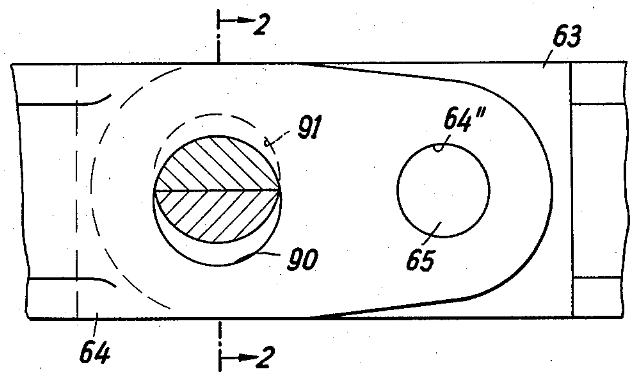
FIG. 1 is a fragmentary side elevational view illustrating one possible manner of interconnecting a pair of beams.
Figure 3:
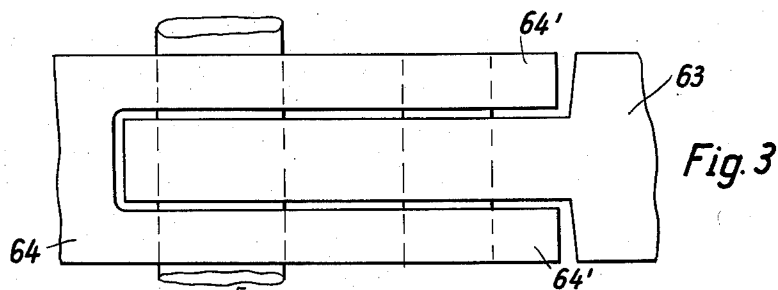
FIG. 3 is a fragmentary top view of the embodiment shown in FIG. 1.

Referring now to the drawing, it will be seen that the beam 64 of FIGS. 1–3 has a bifurcated end portion provided with a pair of spaced walls 64' between which the end portion of the beam 63 freely extends. The beams 63 and 64 are supported in a known way by suitable props not shown in the drawing and serving to hold the beams against the roof of a mine shaft or the like. The walls 64' of the end portion of beam 64 and the end portion of beam 63 are respectively formed with openings 64'' which are aligned and through which a pivot pin 65 extends so that in this way the beams 63 and 64 are pivotally connected for angular movement with respect to each other. Through such angular movement of the beams it is possible to arrange them so that they correspond to the contour of a particular roof to be supported. The walls of the bifurcated end portion of beam 64 and the end portion of beam 63 are furthermore formed with a set of aligned openings 90, 91, respectively, through which a pair of wedge members **66*a* and 66*b*** extend. These wedge members each have the shape of an obliquely split cylinder and are thus together of substantially circular cross section.

The wedge members are driven through the aligned openings from opposite sides and serve to lock the beams in a desired angular position.

Figure 4:
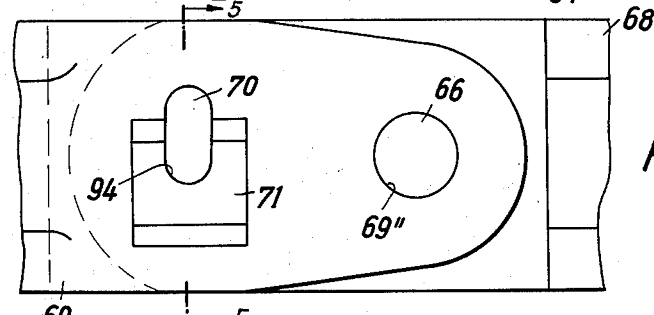
FIG. 4 is a fragmentary side elevational view of a different embodiment of the invention.
Figure 6:
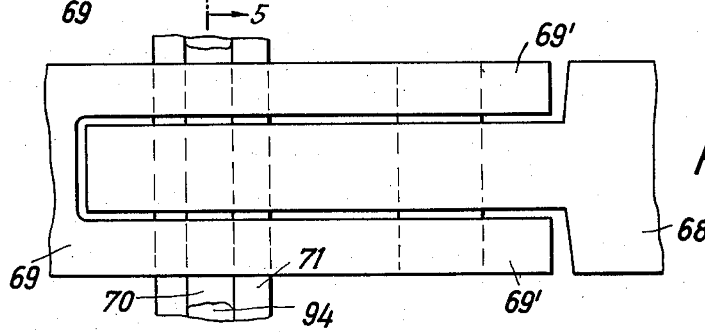
FIG. 6 is a fragmentary top view of the embodiment shown in FIG. 4.

The embodiment of FIGS. 4–6 includes a beam 69 having a bifurcated end portion provided with spaced walls between which an end portion of beam 68 extends, these spaced walls 69' and beam 68 being formed with aligned openings 69'' which receive the pivot pin 66. Furthermore, these spaced walls and the end portion of beam 68 are formed respectively with aligned substantially rectangular openings 92, 93 which receive the wedge members 70 and 71. These wedge members are of substantially rectangular cross section and extend at right angles to each other, as indicated in FIG. 4, wedge member 70 riding in a groove 94 of wedge member 71 in a manner indicated in FIG. 4. Wedge members 70 and 71 are driven into the openings from opposite sides of the beams in the same way as wedge members **66*a* and 66*b***.

The embodiment of the invention illustrated in FIGS. 7 and 8 differs from those shown in FIGS. 1 and 4 in the arrangement of the pivot pin and of the wedge members, in the shape of the wedge members and of the openings in which they are lodged.

Whereas the pivot pin and the opening holding the wedge members are substantially axially aligned in the embodiments of FIGS. 1 and 4, the openings 88, 88' formed respectively in the beams 85 and 86 of FIG. 3 are offset laterally from the pivot 87.

The aligned openings 88 in the bifurcated end portion of beam 85 are substantially of keyhole shape, whereas the coordinated opening 88' in the end portion of beam 86 is quadrilateral, having three straight sides disposed at right angles to each other and one arcuate side in the manner of a rectangle with one arcuate side. The arcuate wall of the opening in beam 86 and the wall facing the arcuate wall are tapered along the axis of the wedge members to be inserted.

A pair of wedge members 89 and 90 extend through the keyhole openings 88 and the aligned opening 88' of the beam 86 of FIGS. 7 and 8, wedge member 90 riding in a groove 95 of wedge member 89, and these wedge members being driven into the openings from opposite sides. The beams 85 and 86 are thereby locked in a given angular position.

It will be understood that each of the elements described above, or two or more together, may also find a useful application in other types of supporting structures differing from the types described above.

While the invention has been illustrated and described as embodied in pivotally interconnected beams of a supporting structure, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a supporting structure, in combination, a first beam having a bifurcated end portion provided with a pair of spaced walls each of which is formed with a pivot opening, said opening in one of said walls being aligned with that in said other wall; a second beam having an end portion freely extending between said spaced walls and formed with a pivot opening aligned with said pivot openings in said walls; a pivot pin extending through said openings; the end portions of one of said first and second beams being formed with an additional opening spaced from said pivot opening in said end portion, the end portion of the other one of said first and second beams being formed with an abutment face located for alignment with said additional opening; and a plurality of contiguous wedge members extending through said additional opening, at least one of said plurality of wedge members abutting against said abutment face.

2. In a supporting structure, in combination, a first beam having a bifurcated end portion provided with a pair of spaced walls each of which is formed with a pair of openings distributed longitudinally along said first beam, the openings in one of said walls being aligned with those in the other of said walls to provide two pairs of aligned openings; a second beam having an end portion extending between said pair of walls and formed with a pair of openings aligned with said pairs of aligned openings to provide two sets of three aligned openings; a pivot pin extending through one of said sets of openings; and a pair of wedge members engaging each other and extending through the other of said sets of openings.

3. In a supporting structure as defined in claim 2, said pair of wedge members having together a substantially circular cross section.

4. In a supporting structure as defined in claim 2, said wedge members each having a substantially rectangular cross section and one of said wedge members extending at right angles with respect to the other of said wedge members.

5. In a supporting structure, in combination, a first beam having a bifurcated end portion provided with a pair of spaced walls each of which is formed with a pair of openings, the openings of one wall being aligned with those of the other wall to provide two pairs of aligned openings and one pair of aligned openings having a keyhole-shape; a second beam having an end portion extending between said side walls and formed with a second pair of openings aligned with said pair of aligned openings to provide two sets of three aligned openings each; a pair of wedge members extending through the set of aligned openings which includes said keyhole openings, said wedge members engaging each other and said beams; and a pivot pin extending through the other set of aligned openings.

References Cited in the file of this patent

FOREIGN PATENTS

| | | |
|---|---|---|
| 1,009,905 | France | Mar. 12, 1952 |
| 1,135,845 | France | Dec. 22, 1956 |